United States Patent
Berenberg

(10) Patent No.: US 9,544,797 B2
(45) Date of Patent: *Jan. 10, 2017

(54) PAYMENT RECONCILIATION IN MIXED-OWNERSHIP LOW-POWER MESH NETWORKS

(71) Applicant: CUBIC CORPORATION, San Diego, CA (US)

(72) Inventor: Paul Berenberg, Los Altos, CA (US)

(*) Notice: Subject to any disclaimer, the term of this patent is extended or adjusted under 35 U.S.C. 154(b) by 230 days.

This patent is subject to a terminal disclaimer.

(21) Appl. No.: 14/555,307

(22) Filed: Nov. 26, 2014

(65) Prior Publication Data

US 2015/0124637 A1    May 7, 2015

Related U.S. Application Data

(63) Continuation of application No. 14/256,501, filed on Apr. 18, 2014, now Pat. No. 8,929,246.

(60) Provisional application No. 61/814,115, filed on Apr. 19, 2013.

(51) Int. Cl.
| | |
|---|---|
| H04L 12/28 | (2006.01) |
| H04W 24/08 | (2009.01) |
| H04L 12/14 | (2006.01) |
| H04M 15/00 | (2006.01) |
| H04L 12/24 | (2006.01) |

(52) U.S. Cl.
CPC ............ *H04W 24/08* (2013.01); *H04L 12/14* (2013.01); *H04L 12/1403* (2013.01); *H04L 12/1453* (2013.01); *H04M 15/68* (2013.01); *H04M 15/8061* (2013.01); *H04L 12/1435* (2013.01); *H04L 41/082* (2013.01); *H04M 15/50* (2013.01); *H04M 15/51* (2013.01); *H04M 15/8214* (2013.01)

(58) Field of Classification Search
None
See application file for complete search history.

(56) References Cited

U.S. PATENT DOCUMENTS

| | | | |
|---|---|---|---|
| 5,585,571 | A | 12/1996 | Lonsdale et al. |
| 5,794,146 | A | 8/1998 | Sevcik et al. |
| 6,515,967 | B1 | 2/2003 | Wei et al. |
| 6,882,634 | B2 | 4/2005 | Bagchi et al. |
| 7,388,853 | B2 | 6/2008 | Ptasinski et al. |
| 7,701,360 | B1 | 4/2010 | Tannenbum |
| 7,830,838 | B2 | 11/2010 | Kohvakka et al. |

(Continued)

FOREIGN PATENT DOCUMENTS

| | | |
|---|---|---|
| KR | 2005/0104393 A | 11/2005 |
| KR | 2010/0112869 A | 10/2010 |

(Continued)

OTHER PUBLICATIONS

Dust Networks, "SmartMesh Technology Overview", obtained online on Dec. 2, 2010 at http://dustnetworks.com/technology, 4 pages.

(Continued)

*Primary Examiner* — Chirag Shah
*Assistant Examiner* — Amar Persaud
(74) *Attorney, Agent, or Firm* — Kilpatrick Townsend and Stockton, LLP

(57) ABSTRACT

Systems and methods that enable scalable, cost-effective payment reconciliation between owners of devices at least temporarily connected in or to a particular low-power, ad hoc mesh network.

13 Claims, 8 Drawing Sheets

(56) References Cited

U.S. PATENT DOCUMENTS

| | | |
|---|---|---|
| 8,069,470 B1 | 11/2011 | Montenegro |
| 8,208,973 B2 | 6/2012 | Mehta |
| 8,219,741 B2 | 7/2012 | Condit et al. |
| 8,363,630 B2 | 1/2013 | Gong |
| 8,416,726 B2 | 4/2013 | Berenberg |
| 8,681,674 B2 | 3/2014 | Berenberg et al. |
| 2002/0141371 A1 | 10/2002 | Hsu |
| 2003/0083796 A1 | 5/2003 | Denton |
| 2004/0006705 A1 | 1/2004 | Walker |
| 2004/0042434 A1 | 3/2004 | Kennedy |
| 2004/0220957 A1 | 11/2004 | McDonough |
| 2005/0141459 A1 | 6/2005 | Li et al. |
| 2005/0222948 A1* | 10/2005 | Sato et al. .............. 705/40 |
| 2005/0261037 A1 | 11/2005 | Raghunath et al. |
| 2006/0072495 A1 | 4/2006 | Mundra et al. |
| 2006/0149980 A1 | 7/2006 | Zhong |
| 2006/0271281 A1 | 11/2006 | Ahn et al. |
| 2006/0291657 A1 | 12/2006 | Benson et al. |
| 2007/0080800 A1 | 4/2007 | Carbone |
| 2008/0037499 A1 | 2/2008 | Kumar et al. |
| 2008/0040481 A1* | 2/2008 | Joshi et al. .............. 709/226 |
| 2008/0181154 A1 | 7/2008 | Sherman |
| 2009/0059827 A1 | 3/2009 | Liu et al. |
| 2009/0146839 A1* | 6/2009 | Reddy et al. .......... 340/870.02 |
| 2009/0282056 A1 | 11/2009 | Patel et al. |
| 2010/0008272 A1 | 1/2010 | Messinger et al. |
| 2010/0046375 A1 | 2/2010 | Goldstein et al. |
| 2010/0246600 A1 | 9/2010 | Das et al. |
| 2010/0283575 A1 | 11/2010 | Tubb et al. |
| 2010/0329232 A1 | 12/2010 | Tubb et al. |
| 2011/0145561 A1* | 6/2011 | Anil .............. 713/150 |
| 2012/0003992 A1 | 1/2012 | Staton et al. |
| 2012/0084438 A1* | 4/2012 | Raleigh et al. .......... 709/224 |
| 2012/0105214 A1* | 5/2012 | Sanders .............. 340/10.42 |
| 2012/0178486 A1 | 7/2012 | Kaufmann |
| 2012/0203918 A1 | 8/2012 | Berenberg et al. |
| 2012/0275360 A1 | 11/2012 | Berenberg |
| 2012/0275361 A1 | 11/2012 | Berenberg et al. |
| 2013/0072223 A1 | 3/2013 | Berenberg et al. |
| 2013/0089003 A1* | 4/2013 | Liang et al. .............. 370/255 |
| 2013/0188513 A1 | 7/2013 | Vasseur et al. |
| 2014/0022969 A1 | 1/2014 | Ryshakov et al. |

FOREIGN PATENT DOCUMENTS

| | | |
|---|---|---|
| WO | 2012/099569 A1 | 7/2012 |
| WO | 2013/040150 A1 | 3/2013 |
| WO | 2014/172673 A2 | 10/2014 |

OTHER PUBLICATIONS

Polastre, Joseph et al., "A unifying link abstraction for wireless sensor networks", Proceedings of the 3$^{rd}$ International Conference on Embedded Networked Sensor Systems: ACM NY pp. 76-89, Nov. 2-4, 2005.

Zheng, J. and M. J. Lee, "A comprehensive performance study of IEEE 802.15.4," *Sensor Network Operations*, IEEE Press, Wiley Interscience, ISBN 0-471-71976-5, Chapter 4, pp. 218-237, 2006.

International Search Report and Written Opinion dated Feb. 23, 2012 for International PCT Application No. PCT/US2011/034436, 7 pages.

International Search Report and Written Opinion dated Apr. 16, 2012 for International PCT Application No. PCT/US2011/034454, 6 pages.

International Search Report and Written Opinion dated Feb. 1, 2013 for International PCT Application No. PCT/US2012/055054, 13 pages.

International Search Report and Written Opinion dated Feb. 27, 2013 for International PCT Application No. PCT/US2012/55176, 11 pages.

* cited by examiner

PAYMENT RECONCILIATION IN MIXED-OWNERSHIP LOW-POWER MESH NETWORKS

CROSS-REFERENCE TO RELATED APPLICATION

This application is a continuation of co-pending U.S. Nonprovisional patent application Ser. No. 14/256,501, filed Apr. 18, 2014, entitled "PAYMENT RECONCILIATION IN MIXED OWNERSHIP LOW-POWER MESH NETWORKS," which claims the benefit of U.S. Provisional Patent Application No. 61/814,115, filed 19 Apr. 2013, entitled "PAYMENT RECONCILIATION IN MIXED OWNERSHIP LOW-POWER MESH NETWORKS," the entirety of both of which is hereby incorporated by reference for all intents and purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. ARINC 400-10.

BACKGROUND

Modern networks can comprise a variety of devices, which may be connected in a variety of ways. A network can be, for example, centralized or ad hoc. In the latter case, each networked device, or node, can act as a router to forward data from other nodes, in addition to communicating its own data. These networks however have their limitations. For example, wireless devices powered by batteries may require frequent battery changes due to the high power cost of wireless data transmission. Further, in many instances it may be prohibitively expensive to keep route and/or manipulate information associated with payment reconciliation for devices that serve to forward data from other nodes.

SUMMARY

Systems and methods that enable scalable, cost-effective payment reconciliation between owners of devices at least temporarily connected in or to a particular low-power, ad hoc mesh network.

For example, in an aspect, a method for enabling payment reconciliation in a mixed-ownership low-power mesh network is disclosed. The method may include or comprise monitoring packet traffic routed by a particular node of the mesh network; identifying an originator node address and a number of units of data for each particular packet of the packet traffic; and sending, in response to a trigger, data to another particular node of the mesh network that represents a total number of units of data routed by the particular node for each originator node address.

In another aspect, a network device for communicating data in a mixed-ownership low-power mesh network is disclosed. The network device may include or comprise a battery; a wireless interface; and a processing unit coupled with the battery and the wireless interface. The processing unit may be configured to cause the network device to: track packet traffic routed by the network device to other network devices at least temporarily connected to the mesh network; record an originator network device address and a number of units of data for each particular packet of the packet traffic; and transfer, in response to a detected command, data over the mesh network to another network device at least temporarily connected to the mesh network that represents a total number of units of data routed by the network device for each originator network device address.

In another aspect, a computer-implemented method is disclosed. The method may include or comprise monitoring, by a particular node connected to a mixed-ownership low-power mesh network, packet traffic routed by the particular node over the mesh network; identifying, by the particular node, an originator node address and ownership thereof and a number of units of data for each particular packet of the packet traffic; and detecting, by the particular node, a command to send data to another particular node of the mesh network that represents a sum total number of units of data routed by the particular node for each originator node address.

Although not so limited, an appreciation of the various aspects of the present disclosure may be gained from the following discussion in connection with the drawings.

DETAILED DESCRIPTION

Figure 1:
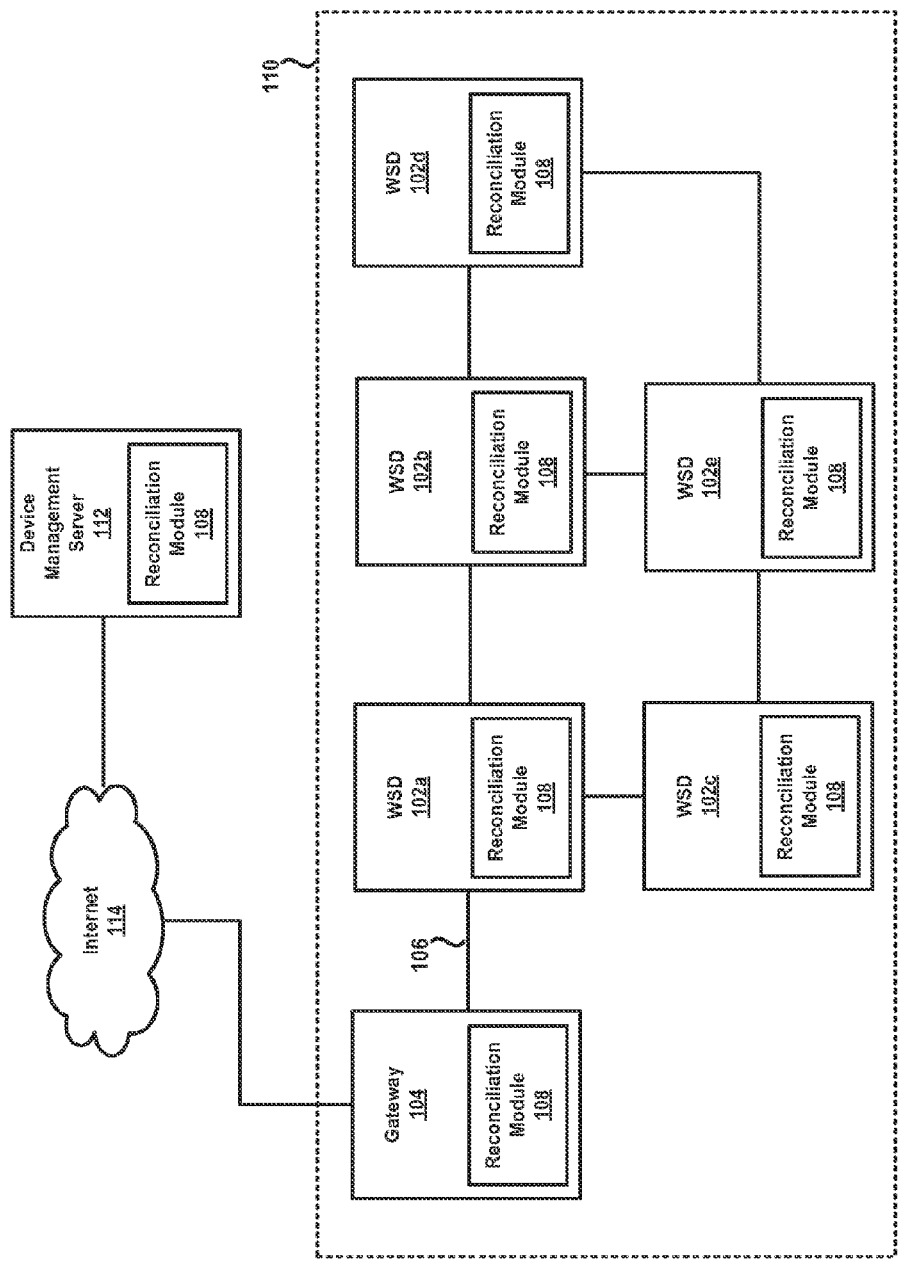
FIG. 1 shows a first example wireless network in accordance with the disclosure.

The present disclosure is directed to or towards systems and methods that enable scalable, cost-effective payment reconciliation between owners of devices at least temporarily connected in or to a particular low-power, ad hoc mesh network. The phrase "payment reconciliation" in the context of present disclosure may refer to one or more actions associated with compensating a particular device owner for allowing the particular device to serve as a router for another device(s). It is contemplated that the type or form of compensation is a business decision, and could embody virtually any type or form of reimbursement as desired.

Payment reconciliation in typical or conventional mesh network implementations is prohibitively expensive, in terms of both the financial and computing resources needed to route and/or manipulate payment reconciliation information. Aspects of the present disclosure address or remedy such issues by accumulating routing information on a node-node basis, and then forwarding such information to a centralized system as needed or requested so that financial and computing resources are more intelligently leveraged.

The wireless networks and wireless network devices, including wireless sensor devices, or WSDs, of the present disclosure may be configured in a variety of ways, in a variety of contexts. Example configurations include mesh, point-to-point, and/or ad hoc networks, among others. The flexible nature of these networks, enabling network devices, or nodes, to join and leave these networks dynamically, together with WSDs configured to collect and communicate sensor and payment reconciliation information, enables these networks to provide end-to-end security and management of transportation and/or logistical systems. Although disclosed embodiments focus on wireless technologies, the techniques described herein can be applied to wired networks, such as an ad hoc serial interface, for example.

For example, a wireless network can comprise a plurality of WSDs providing sensor information relating to a plurality of cargo containers located in a depot or on a train and/or payment reconciliation information relating to data traffic routed through a particular WSD for one or more other particular WSDs. In general, the sensor information can include data from a variety of sensors, which can indicate the temperature and/or humidity of a container, whether the container door is or has been opened, whether the container is experiencing or has experienced a shock, the location of the container, whether the container is moving, and more. The payment reconciliation information in general can include a consolidated set of data that at least identifies an originator node address and a number of units of data (e.g., bits, bytes, etc.,) for each particular packet of packet traffic routed by a particular WSD, as discussed further below.

The wireless network further can include a gateway device that collects the sensor and payment reconciliation information and provides it to systems outside the wireless network. As WSD-equipped containers enter and leave the depot, the wireless network will adjust accordingly, enabling WSDs of containers entering the depot to join the wireless network while the WSDs of containers leaving the depot are dropped from the wireless network. Furthermore, WSDs can act as routers to relay sensor and payment reconciliation information from other WSDs that are not in direct communication with the depot's gateway device.

Low-power wireless networks can be advantageous in transportation, logistical, and similar applications where network devices are mobile devices operating on battery power. Although many battery-operated mobile devices utilize wireless technologies, most mobile devices exhaust their batteries in a matter of hours or days. The term "low-power wireless networks" may refer to wireless networks utilizing technologies that enable battery-powered devices to operate for a year or more without exhausting their batteries. This can include technologies associated with the IEEE 802.15.4 and/or ISO/IEC 18000-7 standards, as well as various proprietary technologies, among others.

Referring now to FIG. 1, a block diagram of an example logistical management system 100 is shown in accordance with the disclosure. In this embodiment, a plurality of WSDs 102 are networked together to generate and communicate, among other things, sensor data and/or payment reconciliation data. For example, a particular WSD 102 gathering sensor data can communicate sensor data toward a gateway 104 using a particular wired and/or wireless communication connection 106. Similarly, a particular WSD 102 gathering payment reconciliation data can communicate payment reconciliation data toward a gateway 104 using a particular communication connection 106. In general, each of the devices or systems within the example system 100 includes a reconciliation module 108 that enables scalable, cost-effective payment reconciliation between owners of the respective devices or systems based on gathered or acquired payment reconciliation data.

For example, a particular instance of a reconciliation module 108 may be configured to monitor packet traffic routed by an associated WSD 102. For example, the reconciliation module 108 associated with the WSD 102a as shown in FIG. 1 may be configured to monitor packet traffic routed by the WSD 102a, as received from one or more of the WSDs 102b-c, to the gateway 104 for further processing. In this example, the reconciliation module 108 associated with the WSD 102a may further identify an originator node address and a number of units of data for each particular packet of the packet traffic. For example, the reconciliation module 108 associated with the WSD 102a may identify an address and/or other identifier associated with the WSD 102b, so that the reconciliation module 108 associated with the WSD 102a may uniquely identify the WSD 102b. These and other processes performed by the reconciliation module 108 associated with the WSD 102a in the present discussion in connection with the WSD 102b are similarly applicable to the WSD 102c.

Further, the reconciliation module 108 associated with the WSD 102a may identify a number of bytes of data and/or a number of packets of data transferred from the WSD 102b to the WSD 102a, which in this case may serve as a data router for the WSD 102b. For example, the reconciliation module 108 associated with the WSD 102a may over a particular period of time identify or log 10 data packets, each comprising 100 bytes data, as having been received from the WSD 102b. In general, this information may be stored by the reconciliation module 108 associated with the WSD 102a within a particular data structure or record. In this manner, the reconciliation module 108 associated with the WSD 102a may keep track of the number of bytes of data and/or the number of packets of data transferred from the WSD 102b to the WSD 102a, so that an owner (e.g., an individual, an organization, etc.) of the WSD 102a may derive revenue for allowing or enabling the WSD 102a to serve as a data router for the WSD 102b. This is assuming that an owner of the WSD 102a is an entity different than an owner of the WSD 102b.

Still further, the reconciliation module 108 associated with the WSD 102a may send, in response to a trigger or signal, data to another particular WSD 102 or the gateway 104 that represents a total number of units of data routed by the WSD 102a for each originator node address. For example, the reconciliation module 108 associated with the WSD 102a may as part of a periodic or at least an intermittent process, or in response to the WSD 102a running out of memory or power or some other critical or limited resource, or in response to a specific command received from another system or device such as the gateway 104 or other device, and etc., send a particular file or set of data to the gateway 104 that specifies that the WSD 102a served as a router for the WSD 102b for a particular period of time, and in that particular period of time received and routed a total of 1000 bytes data for the WSD 102b. These and other such actions associated with payment reconciliation performed by the reconciliation module 108 are discussed in further detail below.

If there are one or more WSDs 102 communicatively linked between a particular WSD 102 originating the sensor data and/or payment reconciliation data and the gateway 104, the one or more WSDs 102 will relay the sensor data and/or payment reconciliation data until it reaches the gateway 104. The example system 100 depicted in FIG. 1 is shown as an example and is not limiting. The sensor network 110 can be configured in a variety of ways. For instance, the gateway 104 can connect with multiple ones of the WSDs 102, and the WSDs 102 can have more or fewer wireless connections than indicated in FIG. 1. Moreover, multiple instances of the gateway 104 and/or multiple instances of the sensor network 110 may be included in the example system 100.

In the example embodiment, the gateway 104 provides connectivity between the sensor network 110, comprising the gateway 104 and WSDs 102, and a device management server (DMS) 112. Communication between the gateway 104 and the DMS 112 can be relayed through the Internet 114, or any other Wide Area Network (WAN). Additionally or alternatively, other networks, such as Local Area Networks (LANs), can be used. Other configurations can include a gateway 104 communicating directly with the DMS 112 without a separate network. The DMS 112 itself provides an interface between the sensor network 110 that can be used by a human user or another system, by utilizing, for example, a graphical user interface (GUI) and/or an application programmable interface (API). The DMS 112 can collect and store information from the WSDs 102. The data communicated between the DMS 112 and the gateway 104 can be securely communicated in encrypted packets, and the DMS 112 can provide secure management of the collected data.

One or more of a variety of physical layers may be used to provide the wireless connections of the sensor network 110. According to one embodiment, the WSDs 102 and gateway 104 communicate using a protocol stack based on IEEE 802.15.4 standard at 2.4 GHz using all 16 channels available in that standard. This physical layer enables the sensor network 110 to operate using very low power and/or predictable power consumption, which can be an important consideration for embodiments in which the WSDs 102 and/or gateway 104 operate on battery power. Nonetheless, other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using multiple RF channels (e.g., narrow-band frequency hopping) or a single RF channel. The gateway 104 can communicate with the Internet 114 through a wired connection and/or a wireless connection, as shown in FIG. 2.

Other embodiments of the logistical management system 100 of FIG. 1 are possible. For example, FIG. 2 is a block diagram of another example logistical management system 200 in accordance with the disclosure. In this embodiment, the gateway 104 can communicate with the Internet 114 wirelessly, through wireless communications with a satellite 202 and/or a cellular tower 204. The use of such a wireless interface between the gateway 104 and the Internet 114 can be a factor of available Internet connectivity and desired mobility of the sensor network 110, among other considerations.

Figure 2:
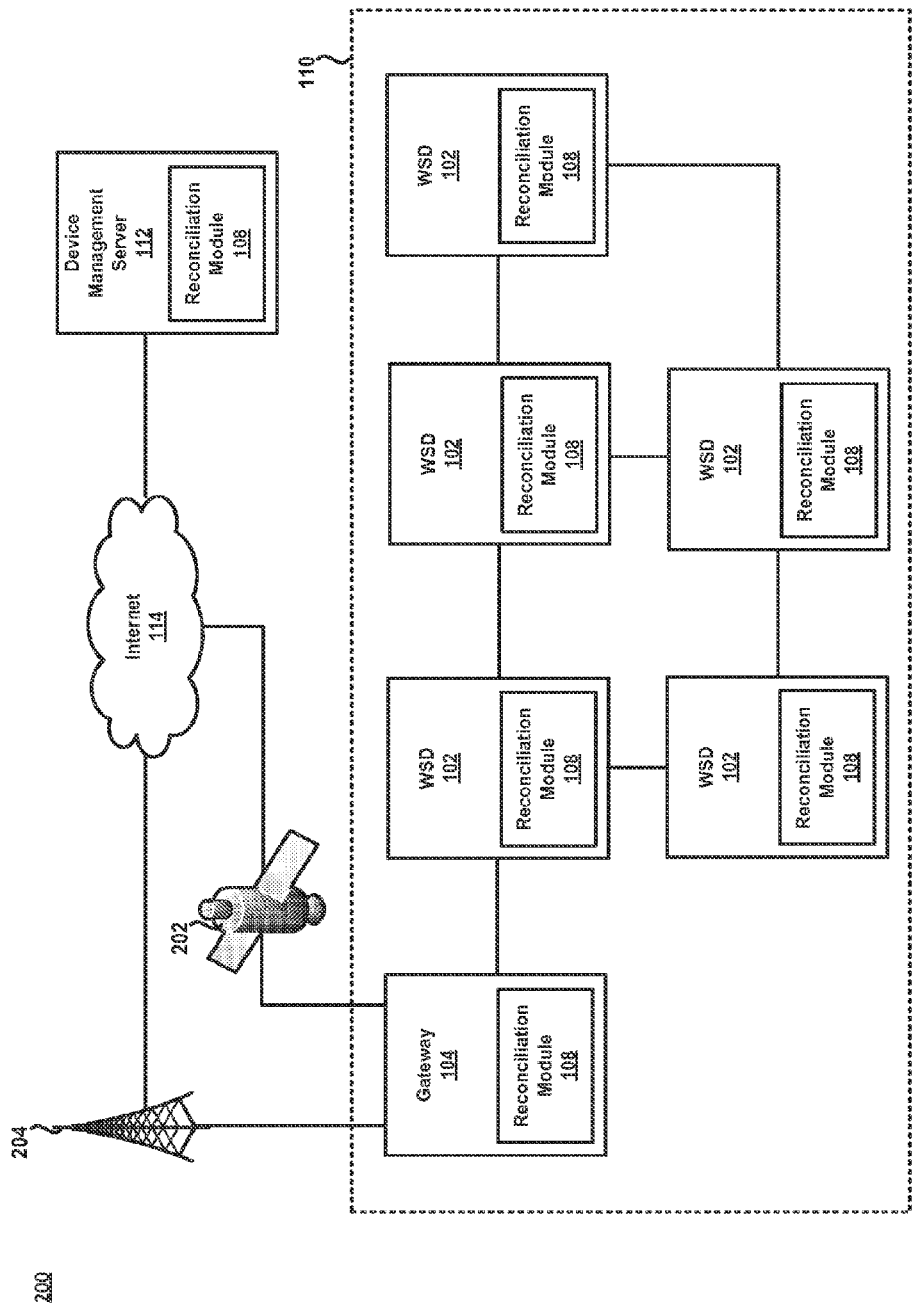
FIG. 2 shows a second example wireless network in accordance with the disclosure.
Figure 3:
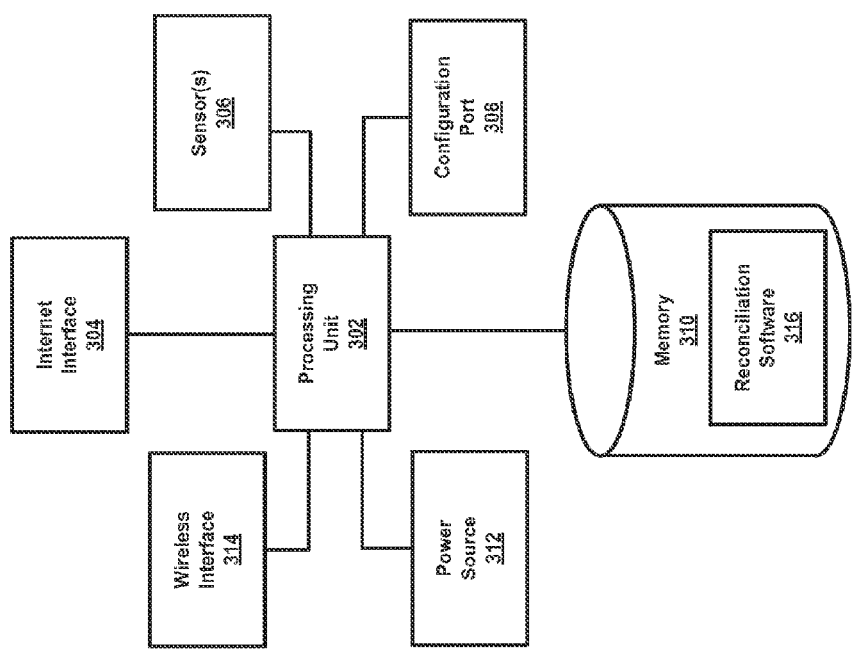
FIG. 3 shows an example gateway device in accordance with the disclosure.

Referring now to FIG. 3, a block diagram of an embodiment of the gateway 104 of FIGS. 1-2 is shown. This block diagram, as with other figures shown herein, is provided as an example only, and is not limiting. The gateway 104 can be configured in alternate ways by, for example, including a global positioning system (GPS) unit and/or other components not shown in FIG. 3. In the example shown, the gateway 104 includes a processing unit 302, an Internet interface 304, one or more sensors 306, a configuration port 308, a memory 310, a power source 312, and a wireless interface 314.

The processing unit 302 lies at the heart of the gateway 104. The processing unit 302 can be comprised of one or more processors, microprocessors, and/or specialized integrated circuits. The processing unit 302 can gather information from the other components of the gateway 104 and/or from other devices of the above-described example system 100 as shown in FIG. 1 and the example system 200 as shown in FIG. 2, and process the information in accordance with software 316 disposed in memory 310. Depending on desired functionality of the gateway 104 and the capabilities of the processing unit 302, the software 316 can include an operating system with one or more executable programs. Additionally, or alternatively, the software 316 can include lower-level instructions, such as firmware and/or microcode, for the processing unit 302 to execute. An example of such may include instructions to implement functionality of the reconciliation module 108 of the present disclosure. Still other embodiments are possible.

The power source 312 supplies power to the components of the gateway 104 and may provide additional information (e.g., battery charge, voltage levels, etc.) to the processing unit 302. When the gateway 104 is a mobile device, the power source 312 can comprise one or more batteries. When the gateway 104 is a fixed or stationary device the power source 312 can include a power converter, transformer, and/or voltage regulator. Still other embodiments are possible.

The wireless interface 314 enables communication with the WSDs 102 of FIGS. 1-2. As indicated above, this communication can be effectuated using any of a variety of technologies, including radio frequency (RF) and/or optical communication technologies. Where RF technologies are used, the wireless interface 314 may be coupled to an antenna (not shown). Still other embodiments are possible.

The configuration port 308 may allow a computing device to be connected to the gateway 104 for the purpose of configuring the gateway 104. The configuration port 308 can comprise universal serial bus (USB) connector, serial port, optical, or other connector to input information from an external device. Depending on the functionality of the gateway 104 and/or WSDs 102, the configuration port 308 may be used to configure device information and reporting, sensor parameters, software, security, network parameters, power consumption, GPS parameters, file management, payment reconciliation parameters and/or setting, and much more.

The Internet interface 304 can be any of a variety of interfaces, depending on desired functionality. As indicated in FIGS. 1-2, the gateway 104 can have a wired connection with the Internet 114, in which case the Internet interface 304 can include an Ethernet or other wired interface. Additionally or alternatively, the gateway 104 can have a wireless connection with the Internet 114. In this case, the Internet interface 304 can comprise one or more wireless radios, such as a dual-mode WAN radio enabling cellular and satellite communication. Still other embodiments are possible.

The one or more sensors 306 may enable the gateway 104 to collect sensor information similar to the WSDs 102. This sensor information can include information relating to temperature, humidity, motion, light, battery charge, shock, and application-specific information (e.g. the state of a door, open or closed, on a cargo container). Depending on desired functionality, the processing unit 210 may collect, process, and/or record the sensor information, or the processing unit 210 simply may send unprocessed sensor information to the DMS 112 using the Internet interface 304.

Figure 4:
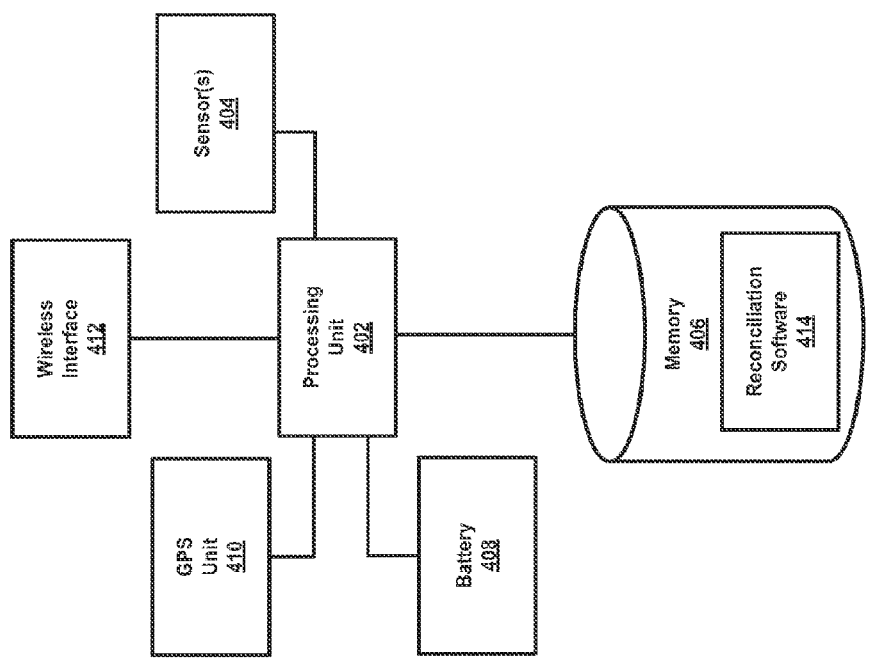
FIG. 4 shows an example wireless sensor device in accordance with the disclosure.

Referring now to FIG. 4, is a block diagram of an embodiment of a WSD 102 is shown. In general, the WSD 102 is configured and/or arranged in a manner similar to the gateway 104. For example, the WSD 102 may be configured to include a processing unit 402, one or more sensors 404, a memory 406, a battery 408, a GPS unit 410, and a wireless interface 412. Here, however, the components may be less complex than corresponding components of the gateway 104, due to power and functionality considerations. Additionally, it can also be noted that the WSD 102 and/or the gateway 104 can include an interface (not shown) to provide a user with information. Such an interface can comprise a liquid-crystal display (LCD), one or more light emitting diodes (LEDs), etc. Other embodiments are possible. For example, in some embodiments, the WSD 102 may be configured exactly similar to the gateway 104 as shown in FIG. 3. In other words, in some embodiments, the WSDs 102 and the gateway 104 as discussed throughout may be the same type of device, so that that gateway 104 itself is a WSD 102, or vice versa.

The processing unit 402 can comprise a microprocessor and the memory 406 and software 414 can comprise programmed logic of the microprocessor. Among other things, the software 414 may include instructions to implement functionality of the reconciliation module 108 of the present disclosure, discussed further below.

With respect to the battery 408, because the wireless network can provide lower-power consumption, a battery having a long shelf life, e.g., an alkaline-, silver-oxide-, or lithium-based battery, can provide for operability of the WSD 102 without the need to change batteries for several years. According to one embodiment, the WSD 102 uses up to 4 A-size 3.6 volt (V) batteries, each battery rated at approximately 3600 milliamp hours (mAh). Some embodiments of the WSD 102 have an operating power of under 2 milliwatts (mW); other embodiments of the WSD 102 operate under 1 mW. Therefore, depending on the shelf life and capacity of the battery 408, as well as the configuration of the WSD 102, the WSD 102 could operate for 10 years or more without the need to change the battery 408.

Further, the GPS unit 410 may provide location information. Location information can be particularly useful where or when the sensor network 110 shown in FIGS. 1-2 is spread over a relatively large geographical area. Moreover, the GPS unit 410 can be used to sense motion of the WSD 102 by determining, by the GPS unit 410 and/or the processing unit 402 a change in location over time.

Similar to that mentioned above, embodiments of the present disclosure provide a methodology for payment reconciliation between device owners for routing services in infrastructure-free (i.e., ad hoc) mesh networks, without putting a burden on resource constrained, low-power devices. Conventional mobile networks typically rely on public-key infrastructure (PKI)-based authentication to enable roaming payments. This is possible because the cellular link is high bandwidth, tower networks bandwidth is even higher, processing power on the mobile devices is not resource constrained for PKI operations, and mobile devices only communicate through cellular networks and never through each other on a regular basis.

In the environment however where a single network can have tens of thousands of resource constrained devices connected into a mesh network, belonging to hundreds of different owners, full PKI authentication is prohibitively expensive in terms of power consumption and bandwidth. The type of currency is expected to be as low as micro-dollars, therefore it is contemplated that the cost of payment reconciliation process must match that in order to be viable, and aspects of the present disclosure achieve this. Among other advantages, embodiments can provide extremely low processing accounting leveraging routing methods, extremely compact data storage for accounting data, and/or a reliable and inexpensive method for accounting data reporting to an accounting backend. Moreover, embodiments may also be used in data traffic pattern analysis, security audits, and/or many other applications.

Figure 5:
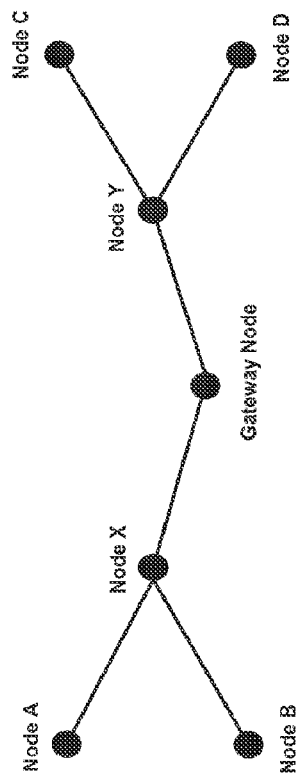
FIG. 5 shows a first example nodal network for payment reconciliation.

In general, and referring now to FIG. 5 which shows a first example simplified mesh network 500 of a plurality of interconnected nodes, routing history in accordance with the present disclosure may be represented as a correspondence table, as shown in Table 1 below, where a packet originator node address and the router address which leads the path to the originator node are stored. Each node as shown in FIG. 5 is intrinsically a router, and each connection shown is intrinsically a bi-directional communication path or connection. Further, each connection shown in FIG. 5 is not necessarily permanent. Rather, new connections may be made and old connections may be broken as nodes (i.e., devices such as those shown above in FIGS. 1-2) connect or disconnect with or from one another in the context of the example mesh network 500.

TABLE 1

| Originator Node Address (OA) | Router Originator Leading Address (RA) |
|---|---|
| A | X |
| B | X |
| C | Y |
| D | Y |

The actual data structure of the routing history need not necessarily be a table, as shown in Table 1. Rather, it is contemplated that the data structure may be another type of structure as desired, such as a binary tree, hash table, etc., and that the data structure may be formatted, modified, compressed, consolidated, etc., so that that the bandwidth required to pass the data structure or at least a portion thereof over the mesh network 500 may be minimized. This and other benefits as described throughout may be realized by the features or aspects of the present disclosure. Additionally, other columns may be include in Table 1 such as, for example, a time to live (TTL) column wherein when no updates are made to the record for TTL, the record is purged. In the example embodiment, every time a data packet travels through a particular mesh node (e.g., Node X) a particular action may occur such as, for example: a) A new record is added to the routing history shown in Table 1, if the packet is from a new originator (e.g., Node A); b) The record is updated with new leading router information if applicable (TTL is reset); or c) No action if the correspondence is the same (TTL is reset). Additionally, or alternatively, whenever the leading router is lost, all records associated therewith are purged. Other embodiments are possible.

It is contemplated that Table 1 may be modified so as to provide for a routing method with accounting according to the principles of the present disclosure. In particular, routing history may still comprise of a correspondence table, where the packet originator node address and the router address which leads the path to the originator node can be stored. As shown in Table 2 below, however, additional field(s) may represent a packet or/and byte counter. In some embodiments, there may be two different columns representing packet and byte counters separately. It is however contemplated that the number and/or types of columns additional to that as shown in Table 2 may be implementation-specific, where ultimately the simplicity and/or minimized size of Table 2 may be considered its most attractive, useful, and efficient characteristic.

TABLE 2

| OA | RA | # of packets transferred/# of bytes transferred |
|---|---|---|
| A | X | 0/0 |
| B | X | 122/13904 |
| C | Y | 45/6554 |
| D | Y | 2/179 |

The values shown in Table 2 are for example purposes only. Further, it is contemplated that the routing table as shown in Table 2 may be collapsed, consolidated, or otherwise reformatted so as to only include that information ultimately necessary to enable scalable, cost-effective payment reconciliation between owners of devices at least temporarily connected in or to a particular low-power, ad hoc mesh network in accordance with the principles of the present disclosure. Specifically, an accounting file F, as shown in Table 3 below, may be derived from the routing table shown in Table 2.

TABLE 3

| OA | # of packets transferred/# of bytes transferred |
|---|---|
| A | 0/0 |
| B | 122/13904 |
| C | 45/6554 |
| D | 2/179 |

The values shown in Table 3 are for example purposes only Further, the simplicity and/or minimized size of the accounting file F as shown in Table 3 may be considered its most attractive, useful, and efficient characteristic. It is contemplated that the accounting file F may be established when a particular device is initiated or initialized. Additionally, the actual data structure of the routing history may not necessarily be a table, as shown in Table 3. Rather, it is contemplated that the data structure may be another type of structure as desired, such as a binary tree, hash table, etc., to enable for "fast" search, replacement, deletion, and other operations. Additionally, it is contemplated that the data structure may be formatted, modified, compressed, consolidated, etc., so that that the bandwidth required to pass the data structure or at least a portion thereof over the mesh network 500 may be minimized.

Additionally, similar to the above-discussion, records (e.g., Tables 1-3 may be considered to be a record, file, data structure, etc.) may have a time to live TTL column (e.g., additional column in Table 2). When no updates are made to the record for TTL, the record may be updated in or appended to the accounting file F as shown in Table 3, and then purged. Further, in the example embodiment, every time a data packet travels through a particular mesh node such as those nodes shown in FIG. 5, a particular action may occur such as, for example: a) A new record is added to routing history, if the packet is from a new originator node, and corresponding "starting" accounting values are established; b) The record is updated with the new leading router information if applicable, and the counter is updated and not reset due to the leading router change, and TTL reset; c) When correspondence is the same, the accounting counter is updated, TTL reset. Other embodiments are possible.

Additionally, it is contemplated that when any leading router is lost, before all record associated with it are purged from the table, they can be stored in the accounting file F as shown in simplified form in Table 3. Storing in this case may refer to either appending the accounting file F with new records or modifying the counter values for the originator nodes that are already in the accounting file F. Modification in this case may refer to the current value in the accounting file F plus a new value from the routing history. Additionally, counters can be stored in the accounting file F periodically, and after this operation the counters in the routing history may be reset to zero. Furthermore, such operations as discussed in connection with Tables 1-3 may be performed as blocking operations where no updates to routing history are made during execution of one or more particular operations. Advantageously, this may prevent losses in accounting wherein certain information may otherwise be lost during the finite period of time needed to update and/or send the accounting file F or an equivalent data structure, possibly compressed to further conserve bandwidth and/or other system or device resources, to another node within the mesh network of FIG. 5 for further processing.

Those and other operations as discussed in connection with FIG. 5 are discussed in further detail below. For example, it is contemplated that the accounting file F may be transferred to an accounting back end periodically, on request, or upon a trigger (e.g. file system or memory is running out of space). Further, file transfer can be a lengthy operation. One or more of the following processes may assist to assure correct accounting and cleanup of the accounting file F: a) At the time of reporting a copy of the accounting file F may be created in the file system; b) The accounting file F may continue to be updated independent of the file transfer; c) The copy may be transferred to the accounting backend associated with a particular node address; c) When positive confirmation is received for the copy transfer, the values within the copy may be subtracted from the accounting file F as a blocking operation. If the new value is zero, the record is purged from the accounting file F and the copy file is deleted. Other embodiments are possible.

Figure 6:
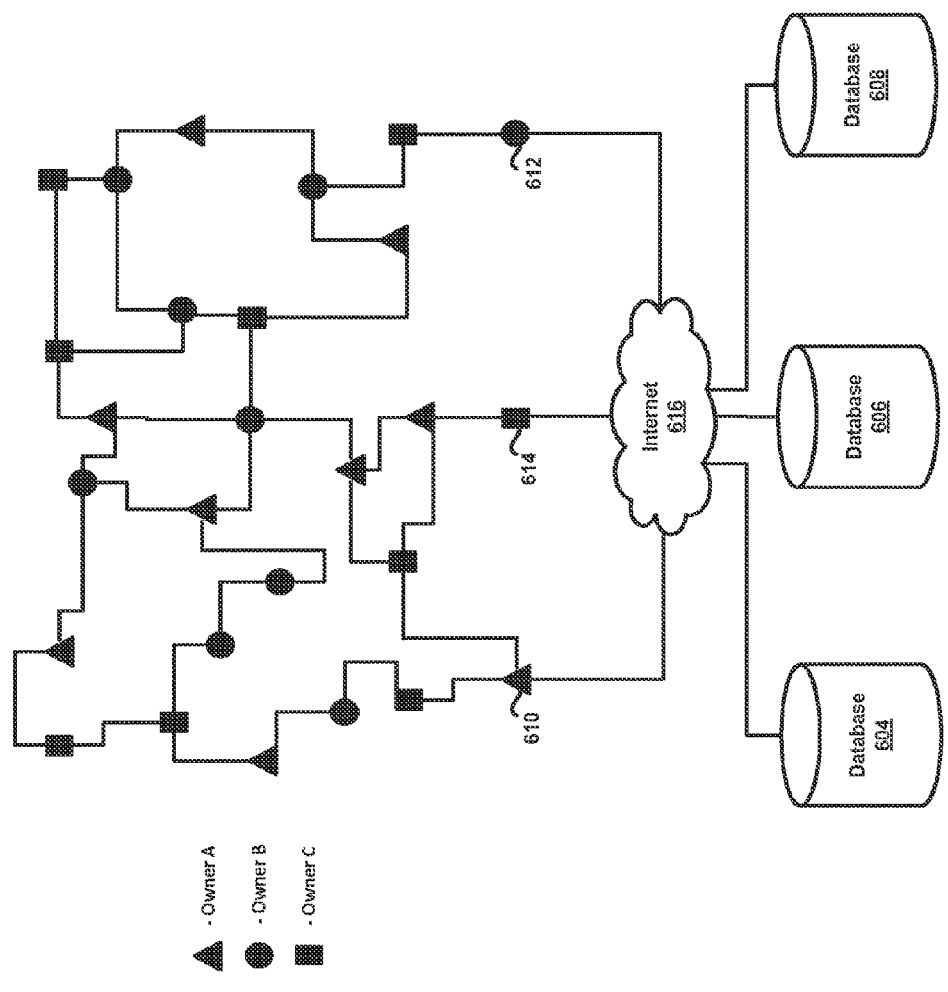
FIG. 6 shows a second example nodal network for payment reconciliation.

Referring now to FIG. 6, a second example simplified mesh network 600 of a plurality of interconnected nodes is shown in accordance with the present disclosure. Example details associated with how respective elements within the example mesh network 600 communicate with and amongst each other in a manner consistent with the context and principles of the present disclosure is or are discussed in U.S. Pat. No. 8,416,726, and U.S. patent application Ser. Nos. 13/023,673, 13/096,127, 13/096,745, 13/553,466, and 13/551,477, wherein the entirety of each of these patent documents is hereby incorporated by reference. In the example of FIG. 6, the mixed-ownership nature of the interconnected nodes is represented whereby those nodes or devices (e.g., WSDs 102, gateway 104, etc.) owned by a particular entity A are indicated as such by the "triangle-shaped" nodes, those nodes or devices owned by a particular entity B are indicated as such by the "circle-shaped" nodes, and those nodes or devices owned by a particular entity C are indicated as such by the "square-shaped" nodes. Also shown is a first database 604, a second database 606, and a third database 608. For discussion purposes, it is assumed that the first database 604 is owned by the particular entity A, the second database 606 is owned by the particular entity B, and the third database 608 is owned by the particular entity C. Other embodiments are possible.

In the current state of the mesh network 600, as represented in FIG. 6 by the shown connectivity between particular nodes, a first node 610 associated with the particular entity A, a second node 612 associated with the particular entity B, and a third node 614 associated with the particular entity C, are essentially or may be referred to as leading nodes, as those nodes alone have a direct connection to the Internet 616. In practice, at least those nodes may serve as routers to other nodes connected thereto, and the nodes connected thereto may change in time due to the ad hoc nature of the mesh network 600. For example, the first node 610 in time may serve as a router for a number of different nodes within the mesh network 600, and may keep track of each originator node address as well as a number of units of data for each particular packet of packet traffic passed by the first node 610 when the first node 610 serves as router to route the packet traffic.

In this example, the first node 610 at some point in time may detect a trigger that commands the first node 610 to send an accounting file or at least a copy thereof to the first database 604, so that the particular entity A may ultimately derive revenue for allowing or enabling the first node 610 to serve as a data router for other nodes. In general, the accounting file may be derived from a particular record, where the record might include a plurality of data that specifies that the first node 610 served as a router for data for a plurality of nodes associated with each of the particular entities A-C. It will be appreciated, however, that the first node 610 may not necessarily be concerned with the resources expended when serving as a router for nodes associated with the particular entity A, since the first node 610 is owned by the particular entity A and it might be unlikely that the particular entity A would charge itself for those services.

Accordingly, in response to the trigger, the first node 610 may delete or otherwise ignore the data that specifies that the first node 610 served as a router for data for a plurality of nodes associated with the particular entity A. However, in this scenario, the first node 610 may aggregate or consolidate the data that specifies that the first node 610 served as a router for data for a plurality of nodes associated with each of the particular entity B and C, since the particular entity A may wish to be reimbursed for allowing or enabling the first node 610 to serve as a router for data for a plurality of nodes associated with those entities (i.e., entity B and entity C). The first node 610 may then send that data to the first database 604 as part of process for payment reconciliation as discussed in the context of the present disclosure.

An original or unmodified data structure or file managed or maintained by the first node 610 may, for example, contain data as shown in Table 4:

TABLE 4

| OA | # of packets transferred/# of bytes transferred |
|---|---|
| A | 56/56345 |
| B | 29/8648 |
| C | 33/634543 |
| D | 5/58 |
| E | 45/456456 |
| F | 78/34524 |
| G | 23/907 |
| . . . | . . . |

The values shown in Table 4 are for example purposes only. In this example, the first node 610 may query a local resource, such as a look-up table or external device or system to determine ownership of those devices associated with node addresses A-G. Here, the first node 610 may determine for example that node addresses A-C are associated with the particular entity A, and may ignore associated data. The first node 610 may further determine for example that node addresses D-E are associated with the particular entity B, and that node addresses F-G are associated with the particular entity C. A modified data structure or file based on that may be generated by the first node 610 and may, for example, contain data as shown in Table 5:

TABLE 5

| Entity | # of packets transferred/# of bytes transferred |
|---|---|
| B | 50/456514 |
| C | 101/35431 |
| . . . | . . . |

In this example, the first node 610 has compressed or otherwise consolidated the original data structure or file so that the first node 610 may use as little bandwidth, power, resources, etc., to transfer the data to the first database 604 as part of process for payment reconciliation as discussed in the context of the present disclosure. Other embodiments are possible.

Figure 7:
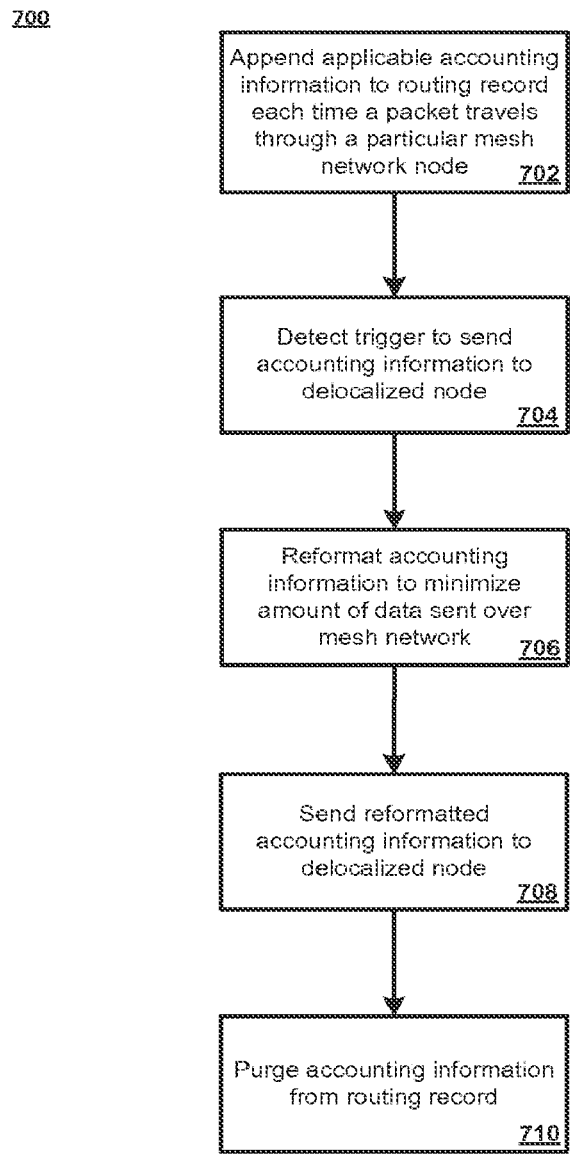
FIG. 7 shows an example method in accordance with the disclosure.

Referring now to FIG. 7, an example method 700 is shown in accordance with the present disclosure. In general, steps of the method 700 may be implemented by any particular reconciliation module 108 as shown in the Figures and discussed above as part of process for payment reconciliation. Other embodiments are possible.

At step 702, accounting information may be appended as desired to a particular routing record each time a packet travels through a particular mesh network node. For example, each time a packet is routed by the WSD 102*a* as shown and discussed above in connection with at least FIG. 1, the reconciliation module 108 associated with the WSD 102*a* may either create a new entry for a particular originator node address if not already contained within a routing table (e.g., a table similar to that shown in Table 3), and associate a particular number of bytes of data and/or a number of packets of data with the new entry, or update an existing entry for a particular originator node address if already contained within a routing table, and associate a particular number of bytes of data and/or a number of packets of data with the existing entry. Other embodiments are possible.

At step 704, a trigger may be detected that instantiates a process whereby certain accounting information within the record mentioned above in connection with step 702 may be sent or transferred from the particular mesh network node to another particular mesh network node. For example, the reconciliation module 108 associated with the WSD 102*a* may as part of a periodic process, or in response to the WSD 102*a* running out of memory or power or some other critical or limited resource, or in response to a specific command received from another system or device such as the gateway 104 or other device, and etc., instantiate a process whereby the WSD 102*a* aggregates or consolidates data that specifies that the WSD 102*a* served as a router for data for a plurality of nodes associated with a particular entity other than one associated with the WSD 102*a*. Other embodiments are possible.

At step 706, accounting information within the record mentioned above in connection with step 702 may be modified, reformatted, compressed, etc., as desired to minimize the amount of data and amount or number resources required to send such information over a network connection. More specifically, it is contemplated that this process will be implemented so as to minimize the amount of power, memory, and other resources of the particular mesh network node. For example, the reconciliation module 108 associated with the WSD 102*a* may modify and/or compress data contained within its routing table, so that certain data may deleted or otherwise ignored that specifies that the WSD 102*a* served as a router for data for a plurality of nodes associated with the particular entity also associated with the WSD 102*a*, and other data may be consolidated in manner as shown and described above in connection with Table 5. Other embodiments are possible. At step 708, the accounting information as modified in connection with step 706 may sent to the another particular mesh network node as discussed in connection with step 704. Last, at step 710, the accounting information within the record mentioned above in connection with step 702 may be purged so as to maximally utilize memory and possibly other resources of the particular mesh network node. Other embodiments are possible.

As mentioned above, payment reconciliation in typical or conventional mesh network implementations is prohibitively expensive, in terms of both the financial and computing resources needed to route and/or manipulate payment reconciliation information. Aspects of the present disclosure address or remedy such issues by accumulating routing information on a node-node basis, and then forwarding such information to a centralized system as needed or requested so that financial and computing resources are more intelligently leveraged.

For example, systems, devices, computer-program products, and methods for enabling payment reconciliation in a mixed-ownership, low-power mesh network are disclosed. In practice, it is contemplated that packet traffic routed by a particular node of the mesh network may be monitored, an originator node address and a number of units of data for each particular packet of the packet traffic may be identified, and data may be sent, in response to a detected trigger, to another particular node of the mesh network that represents a total number of units of data routed by the particular node for each originator node address.

For example, in accordance with the disclosure, each particular network node or device within or at least temporarily connected to the mesh network is intrinsically a router, and may be configured and/or arranged to exhibit features or functionality that permit each particular network node or device itself to monitor, observe, track, keep an accounting record of, etc., on a packet-by-packet basis, packet traffic routed by the same on behalf of other network nodes or devices within or at least temporarily connected to the mesh network. Additionally, each particular network node or device within or at least temporarily connected to the mesh network may be configured and/or arranged to access a stored, possibly periodically or at least intermittently updated, look-up table or any other organized data structure, and/or parse each particular routed data packet, to derive or identify a unique network address associated with another particular node of the mesh network for which packet traffic has been routed. Further, each particular network node or device within or at least temporarily connected to the mesh network may be configured and/or arranged to precisely determine and send to another node or device a total (e.g., summed) number of units of data routed for each originator node address. In general, this may likened to an accounting process whereby a running total of bits, bytes, etc., associated with another particular node of the mesh network for which packet traffic has been routed is maintained and/or managed. Other embodiments, implementations, aspects, features, etc., are possible as well.

For example, additionally, or alternatively, the method may include or comprise identifying ownership for each originator node address, summing the number of units of data for each originator node address with shared ownership, and sending the summed number of units of data to the another particular node with an identifier of ownership. Advantageously, such a feature may, among other things, minimize the amount of bandwidth needed to transfer data across the mesh network, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise compressing the data that represents the total number of units of data routed by the particular node for each originator node address prior to sending. For example, in accordance with the disclosure, each particular network node or device within or at least temporarily connected to the mesh network may be configured and/or arranged to implement a particular data compression algorithm (e.g., lossless or lossy) to encode using as few bits as possible any and all data transferred or sent to other nodes or device within or at least temporarily connected to the mesh network. Advantageously, such a feature may, among other things, minimize the amount of bandwidth needed to transfer data across the mesh network, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise encrypting and authenticating the data that represents the total number of units of data routed by the particular node for each originator node address prior to sending. For example, in accordance with the disclosure, each particular network node or device within or at least temporarily connected to the mesh network may be configured and/or arranged to implement a particular encryption and/or authentication algorithm. Advantageously, such a feature may, among other things, introduce one or more security measures into the system, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise nullifying data that represents the total number of units of data routed by the particular node for at least one particular originator node address prior to sending other data to the another particular node. Additionally, or alternatively, the method may include or comprise determining ownership of the another particular node, and sending the data that represents the total number of units of data routed by the particular mesh for each originator node address when a fee for routing data by the another particular node is determined to be zero. Advantageously, such a feature(s) may, among other things, allow a particular node or device to ignore accounting data that might normally not be necessary to keep track of, such as accounting data associated with a particular in-common ownership entity, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise receiving notification from the another particular node confirming receipt of the data that represents the total number of units of data routed by the particular node for each originator node address. For example, in accordance with the disclosure, each particular network node or device within or at least temporarily connected to the mesh network may be configured and/or arranged to send a confirmation message indicating receipt of accounting data from another network node or device. Advantageously, such a feature may, among other things, allow a particular network node or device to implement housekeeping or clean-up activities to a particular accounting file following confirmation of data transfer, to generally minimize the size of the file and thus minimize the amount of bandwidth needed to transfer data across the mesh network, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise continuing monitoring packet traffic routed by the particular node of the mesh network during the sending, and identifying originator node address and number of units of data for each particular packet of the packet traffic during the sending. For example, in accordance with the disclosure, each particular network node or device within or at least temporarily connected to the mesh network may be configured and/or arranged to continue with bookkeeping or accounting activities even during the process of sending and/or manipulating bookkeeping or accounting information, so as to at all times keep track of routed packet traffic. Advantageously, such a feature may, among other things, allow a particular node or device to maintain and/or manage an accurate running account of bookkeeping or accounting information, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise modifying an existing data structure maintained by the particular node to include the total number of units of data routed by the particular node for each originator node address. Additionally, or alternatively, the method may include or comprise modifying an existing data structure maintained by the particular node to include a particular originator node address and a total number of units of data routed by the particular node for particular originator node address. For example, in accordance with the disclosure, each particular network node or device within or at least temporarily connected to the mesh network may be configured and/or arranged to maintain and/or manage a distinct bookkeeping or accounting file or data structure, so as to at all allow for a system wide account or accounting of routed packet traffic. Advantageously, such a feature may, among other things, allow a particular node or device to maintain and/or manage an accurate running account of bookkeeping or accounting information, thereby enabling scalable, cost-effective payment reconciliation between owners of devices at least temporarily connected in or to a particular low-power, ad hoc mesh network in accordance with the principles of the present disclosure.

Additionally, or alternatively, the method may include or comprise sending the data to the another particular node that represents the total number of units of data routed by the particular node for each originator node address in response to a periodic trigger instantiated by the particular node. Additionally, or alternatively, the method may include or comprise sending the data to the another particular node that represents the total number of units of data routed by the particular node for each originator node address in response to a trigger instantiated by the particular node based on a particular resource condition of the particular node. Additionally, or alternatively, the method may include or comprise sending the data to the another particular node that represents the total number of units of data routed by the particular node for each originator node address in response to a particular command received by the particular node from a different node connected to the mesh network. For example, in accordance with the disclosure, each particular network node or device within or at least temporarily connected to the mesh network may be configured and/or arranged to report its bookkeeping or accounting file or data structure to another particular network node or device within or at least temporarily connected to the mesh network in response to any of a number of different types of commands or triggers. Advantageously, such a feature may, among other things, introduce flexibility into the system, thereby enabling scalable, cost-effective payment reconciliation between owners of devices at least temporarily connected in or to a particular low-power, ad hoc mesh network in accordance with the principles of the present disclosure.

Figure 8:
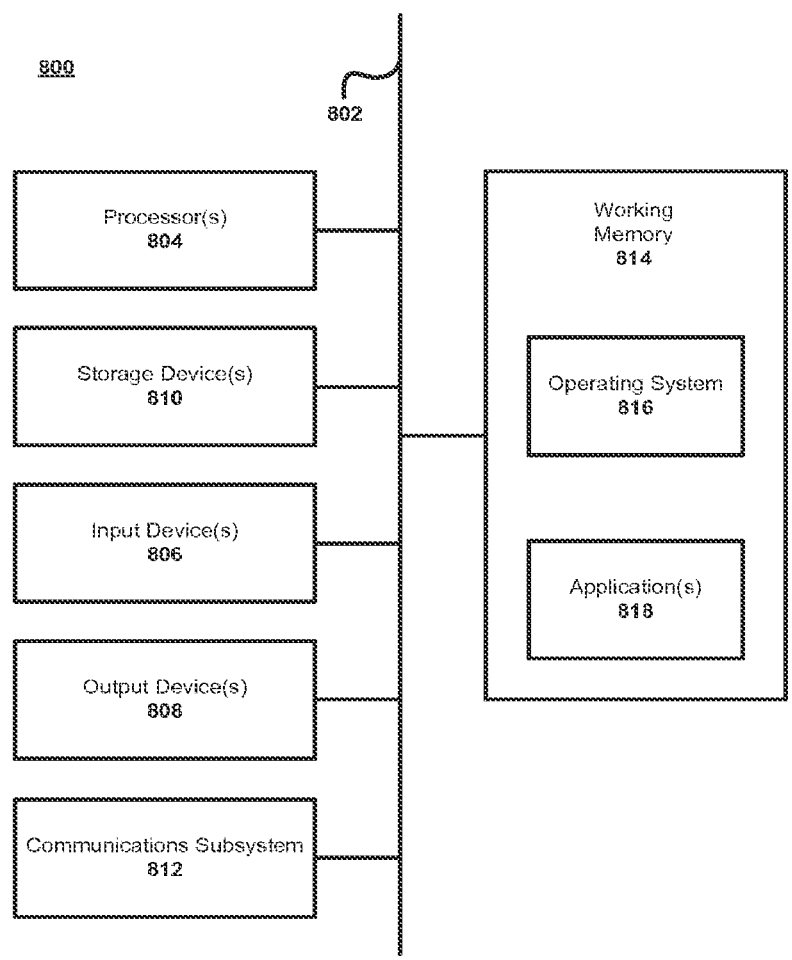
FIG. 8 shows an example computing system or device.

FIG. 8 shows an example computer system or device 800 in accordance with the present disclosure. An example of a computer system or device includes a wireless sensor device, an enterprise server, blade server, desktop computer, laptop computer, tablet computer, personal data assistant, and/or any other type of machine configured for performing calculations. The computer system 800 may be wholly or at least partially incorporated as part of previously-described computing devices, such as any of the respective elements of at least FIGS. 1-2. Further, the computer device 800 may be configured to perform and/or include instructions that, when executed, cause the computer system 800 to perform the method of FIG. 7. Still further, the computer device 800 may be configured to perform and/or include instructions that, when executed, cause the computer system 800 to instantiate and implement functionality of the reconciliation module 108 of at least FIGS. 1-2.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 812 may permit data to be exchanged with a network (such as the network described below, to name one example), other computer systems, and/or any other devices described herein. In many embodiments, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software, firmware (including portable software, such as applets, etc.), or each. Further, connection to other computing devices such as network input/output devices may be employed.

As mentioned above, in one aspect, some embodiments may employ a computer system (such as the computer device 800) to perform methods in accordance with various embodiments of the disclosure. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device for communicating data in a mixed-ownership low-power mesh network, comprising: a battery; a wireless interface; and
a processing unit coupled with the battery and the wireless interface and configured to: monitor packet traffic routed by the network device;
identify an originator node address and a number of units of data for each particular packet of the packet traffic; and
send, in response to a trigger, data to another network device of the mesh network that represents a total number of units of data routed by the network device for each originator node address;
wherein the processing unit further configured to:
identify ownership for each originator node address;
sum the number of units of data for each originator node address with shared ownership; and
send the summed number of units of data to the another network device with an identifier of ownership;
wherein the processing unit further configured to:
determine ownership of the another network device; and
send the data that re resents the total number of units of data routed by the network device for each on originator node address when a fee for routing data the another network device is determined to be zero.

2. The network device of claim 1, wherein the processing unit further configured to:
compress the data that represents the total number of units of data routed by the network device for each originator node address.

3. The network device of claim 1, wherein the processing unit further configured to:
encrypt and authenticate the data that represents the total number of units of data routed by the network device for each originator node address.

4. The network device of claim 1, wherein the processing unit further configured to:
nullify data that represents the total number of units of data routed by the network device for at least one particular originator node address prior to sending other data to the another network device.

5. The network device of claim 1, wherein the processing unit further configured to:
receive notification from the another network device confirming receipt of the data that represents the total number of units of data routed by the network device for each originator node address.

6. The network device of claim 1, wherein the processing unit further configured to:
continue monitoring packet traffic routed by the network device during the sending of data to the another network device; and
identify an originator node address and number of units of data for each particular packet of the packet traffic during the sending of data to the another network device.

7. The network device of claim 1, wherein the processing unit further configured to:
detect the trigger and send the data to the another network device.

8. The network device of claim 1, wherein the processing unit further configured to:
modify an existing data structure maintained by the network device to include the total number of units of data routed by the network device for each originator node address.

9. The network device of claim 1, wherein the processing unit further configured to:
modify an existing data structure maintained by the network device to include a particular originator node address and a total number of units of data routed by the network device for the particular originator node address.

10. The network device of claim 1, wherein the processing unit further configured to:
send the data to the another network device that represents the total number of units of data routed by the network device for each originator node address in response to a periodic trigger instantiated by the network device.

11. The network device of claim 1, wherein the processing unit further configured to:
send the data to the another network device that represents the total number of units of data routed by the network device for each originator node address in response to a trigger instantiated by the network device based on a particular resource condition of the network device.

12. The network device of claim 1, wherein the processing unit further configured to:

send the data to the another network device that represents the total number of units of data routed by the network device for each originator node address in response to a particular command received by the network device from a different network device connected to the mesh network.

13. The network device of claim 1, wherein the processing unit further configured to:
send the data to the another network device that represents the total number of units of data routed by the network device for each originator node address in addition to data that represents a unique identifier for each originator node address.

* * * * *